United States Patent Office 2,914,468
Patented Nov. 24, 1959

---

2,914,468

MILD HYDROFINING OF LIGHT VIRGIN NAPHTHAS

Emil H. Lewis, Union, and Charles E. Thompson, Fanwood, N.J., assignors to Esso Research and Engineering Company, a corporation of Delaware No Drawing. Application November 20, 1956
Serial No. 623,315

5 Claims. (Cl. 208—213)

This invention relates to an improved process for upgrading and desulfurizing light virgin naphthas. More particularly it relates to a hydrofining process of this nature utilizing very mild conditions of both hydrogen treating and hydrogen consumption.

The hydrofining of virgin naphthas with hydrofining catalysts in order to desulfurize and upgrade them at this stage is well known. Additionally, it has been learned that advantages are derived in hydrofining operations by selecting conditions such as to secure minimal hydrogen consumption. These low consumption processes continue to employ relatively high rates of hydrogen recycle, for example, about 1000 cu. ft./bbl. These recycle rates require the presence of a rather large stripper to remove the $H_2S$, hydrogen and $C_3$-hydrocarbons evolved from the higher boiling hydrocarbon fraction.

It has now been found that light virgin naphthas can be upgraded and desulfurized by treating them in the presence of a hydrofining catalyst under mild conditions of both hydrogen treating and hydrogen consumption. These controlled conditions not only provide a very satisfactory product but greatly simplify feed stock preparation and the finished product purification. No stripper is necessary but degasification of $H_2S$, $H_2$ and $C_3$-hydrocarbons from the liquid product is accomplished in one simple tower or a simple gas separation means such as a flash drum.

The light virgin naphthas treated are those boiling in the range of about $C_1$ to 430° F. The feed can be unstabilized naphtha taken directly from crude distillation thus eliminating additional fractionating equipment. The feed can also be a stabilized naphtha, i.e., one obtained by removing the $C_3$'s and lighter.

The hydrofining catalysts that can be employed in the hydrofining include 5–15% molybdenum oxide on activated alumina, mixtures of cobalt oxides (2–6 wt. percent) and molybdenum oxides (6–15 wt. percent), cobalt molybdate on activated alumina, and other sulfur resistant hydrogenation catalysts.

Regeneration of the fixed catalyst may be required periodically, depending largely upon the nature of the feed stock. This regeneration is conveniently carried out at a temperature of about 900° to 1100° F. with an oxygen-containing gas.

The hydrogen-containing gas that is used in the process contains 40–100% hydrogen. Recycle gas is not required. The fresh hydrogen gas can be mixed with non-interfering diluents and can be derived from other refinery sources such as from hydroforming units. The hydrogen treating rate in any case is maintained at a maximum of 30 s.c.f./bbl.

The conditions of the hydrofining operation are set forth in tabular form below:

HYDROFINING CONDITIONS

|  | Broad Range | Preferred Range |
|---|---|---|
| Temperature, ° F | 450–750 | 500–650 |
| Pressure, p.s.i.g | 50–800 | 200–350 |
| Feed Rate, v./hr./v | 1–10 | 3–4 |
| $H_2$ Consumption, s.c.f./b | 5–25 | 10–20 |
| $H_2$ Content Treating Gas, vol. percent | 40–100 | 40–100 |

The mild hydrofining may be carried out by contacting feed and hydrogen with the catalyst either by batch or by continuous flow operation.

In continuous operation, the oil and hydrogen are contacted with catalyst by continuous flow through a vessel packed with catalyst. The oil feed to the reactor is preheated to the required temperature by means of a furnace or similar means. The low treat gas rate makes it unnecessary to preheat the hydrogen or the hydrogen may be mixed with the feed stock and the mixture passed through the furnace. The degree of contact of oil saturated with hydrogen with the catalyst is determined by the ratio of the oil flow rate to the catalyst volume.

After the hydrofining process has been carried out by the continuous technique described, the product is cooled until all the $C_{4+}$ fraction is in the liquid phase. A small portion of the lighter reactor effluent is separated. The dissolved gases lighter than $C_4$ may be separated in a simple drum in which pressure is dropped sufficiently to "flash" about 1–2% of the hydrofined product. Hydrogen is thereby separated from the product together with about 90% to 95% of the by-product gases formed as a result of the hydrofining.

The residual traces of $H_2S$ in the hydrofined product may be eliminated if necessary by caustic washing. A single stage treatment using about 2 to 5 weight percent of about 5° Bé. caustic is satisfactory.

The advantages of this invention will be better understood by reference to the following example.

Example

West Texas light virgin naphtha of $C_1$–300° F. B.P. was hydrofined at the very low hydrogen rate of 30 s.c.f./b. The reactor pressure was 225 p.s.i.g., feed rate was 4 v./hr./v. and the catalyst used was 10–14 mesh cobalt molybdate on alumina. The temperature was varied from 600° F. to 500° F. The stabilized feed and product inspections are shown in the following table.

|  | Feed | 600° F. | 550° F. | 500° F. |
|---|---|---|---|---|
| Gravity, °API | 67.5 | 66.5 | 66.4 | 66.8 |
| S, p.p.m. (Lamp) | 1,200 | 5 | 8 | 34 |
| Octane No.: |  |  |  |  |
| Res. Clear | 61.3 | 61.7 | 61.2 | 63.0 |
| Res. + 3 cc. TEL | 78.4 | 82.6 | 80.9 | 82.4 |
| Motor Clear | 60.2 | 61.5 | 61.5 | 60.2 |
| Motor + 3 cc. TEL | 78.0 | 82.5 | 82.5 | 81.9 |

The sulfur was reduced from 1200 to 5 p.p.m. at 600° F. and to 34 p.p.m. at 500° F. despite the relatively low hydrogen treating rates. Sulfur removal was satisfactory and the octane increase was fairly constant throughout the temperature range studied. Hydrogen consumption was 12–15 s.c.f./bbl.

The advantages of this invention will be apparent to the skilled in the art. High quality products are obtained with savings in both quantities of hydrogen and equipment sizes and process steps. Recycle is unnecessary, heating economies are effected and processing of the heated oil is simplified.

It is to be understoood that this invention is not limited to the specific examples which have been offered merely as illustrations and that modifications may be made without departing from the spirit of the invention.

What is claimed is:

1. A process for upgrading and desulfurizing a light virgin naphtha boiling within the range of about $C_1$ to 430° F. which comprises hydrofining said virgin naphtha in the presence of a hydrofining catalyst at a temperature in the range of 450° to 750° F. with a maximum hydrogen treating rate of 30 s.c.f./b. and a hydrogen consumption rate of less than 25 s.c.f./b., cooling the reaction products to condense the $C_{4+}$ fraction, and segregating the hydrofined product from hydrogen sulfide and other by-product gases by dropping the pressure sufficiently to flash about 1–2% of the hydrofined product.

2. The process of claim 1 in which the feed is an unstabilized naphtha.

3. The process of claim 1 in which the feed is a stabilized naphtha.

4. The process of claim 1 in which the temperature utilized is in the range of 500–650° F. and the hydrogen consumption rate is in the range of 10–20 s.c.f./b.

5. The process of claim 1 in which the liquid product is washed with caustic to remove residual traces of hydrogen sulfide in the hydrofined product.

References Cited in the file of this patent

UNITED STATES PATENTS

| | | |
|---|---|---|
| 2,760,905 | MacLaren | Aug. 28, 1956 |
| 2,762,852 | Jones et al. | Sept. 11, 1956 |